Feb. 24, 1953 — A. M. STONER ET AL — 2,629,414
BIT BRACE HAVING A CHUCK WITH SLIDING ACTUATOR
Filed Oct. 21, 1949
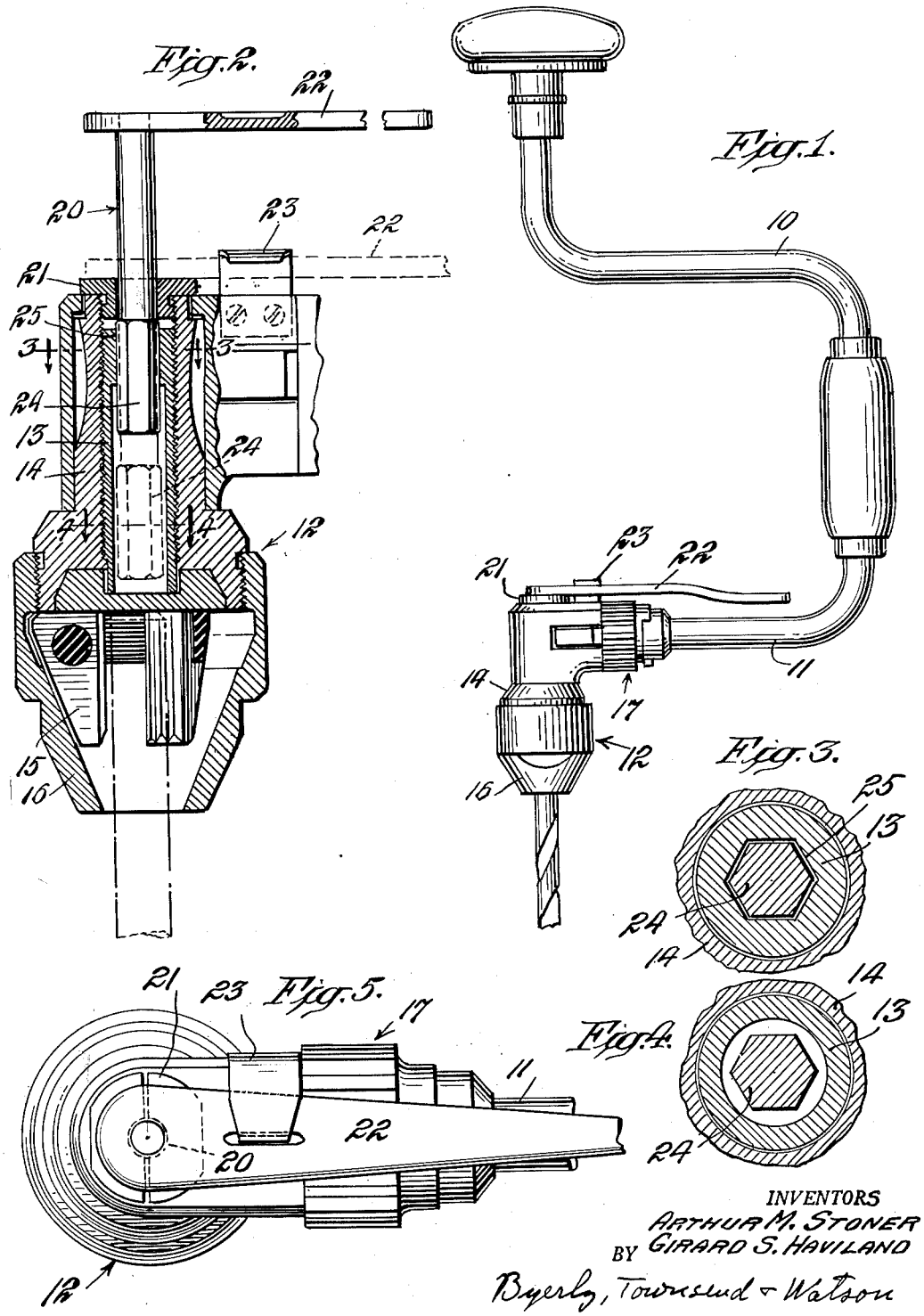
INVENTORS
ARTHUR M. STONER
GIRARD S. HAVILAND
BY Byerly, Townsend & Watson
ATTORNEYS Patented Feb. 24, 1953

2,629,414

UNITED STATES PATENT OFFICE 2,629,414

BIT BRACE HAVING A CHUCK WITH SLIDING ACTUATOR

Arthur M. Stoner and Girard S. Haviland, West Hartford, Conn., assignors to The Jacobs Manufacturing Company, West Hartford, Conn., a corporation of Connecticut Application October 21, 1949, Serial No. 122,728

4 Claims. (Cl. 145—66)

This invention provides a bit brace which holds a tool shank so firmly that round-shank tools may be used in it. It thus introduces an economy in the hand tool art, doing away with the necessity for tools with square shanks which are more expensive to manufacture than those with round shanks.

The chuck forming part of an ordinary bit brace is tightened by relative turning of two cooperating threaded members. The inner one of them forms part of the chuck body which is fixed to the brace handle and can be held firmly. The outer one is a knurled sleeve which must be gripped by the hand in order to turn it. The force which can be applied to cause relative turning of the two members is, therefore, limited to that which can be applied frictionally on a small radius. Furthermore, a considerable portion of the rotative force thus applied is lost in friction on the comparatively large diameter thread used between the sleeve and the body of the chuck. We have avoided these disadvantages by providing a bit brace in which each of the two cooperating threaded members of the chuck is provided with a radial handle so that a high torque can easily be applied to cause relative turning of the members; and, in accordance with another feature of our invention, we have made the outer, instead of the inner, threaded member part of the chuck body and connected the two threaded members by an efficient thread of small diameter. These improvements make it possible to close the chuck jaws on the tool very much more tightly than has heretofore been possible and, as we have found, tightly enough to hold a round-shank tool securely.

In the bit brace which we have invented, the lower radial arm of the brace forms a radial handle for one of the cooperating threaded members of the chuck while a radial handle for the other threaded member is formed on an actuator which is mounted on the chuck in such manner that it can slide axially thereon. In one axial position of the actuator, the actuator is engaged with the free threaded member and the handle on the actuator is located at some distance from the lower radial arm of the brace. The handle and the lower arm of the brace may then be grasped, one with each hand, so as to apply a strong torque to the cooperating threaded members closing the chuck tightly on the tool shank. In another axial position of the actuator, it is disengaged from the free threaded member of the chuck and its radial handle lies close to the lower radial arm of the brace handle so that it may be clipped to this arm and held out of the way during the use of the bit brace.

In order that our invention may be clearly understood, we will describe in detail the embodiment of it which is illustrated in the drawings, in which Fig. 1 is a side view of a bit brace provided with a jaw element of the type shown in U. S. patents to Arthur M. Stover, 2,346,706, 2,403,136, 2,459,899 and 2,459,900;

Fig. 2 is an axial section of the chuck shown in Fig. 1 and parts cooperating therewith;

Figs. 3 and 4 are vertical sections on the lines 3—3, 4—4 of Fig. 2; and

Fig. 5 is a top view of the chuck and other parts shown in Fig. 2.

The bit brace illustrated has the usual crank handle 10 on the lower arm 11 of which is secured the tool chuck 12. The chuck is operated by cooperating inner and outer threaded members 13, 14. Relative turning of these members closes the chuck by forcing gripping jaws 15 of the collet, engaged by the inner member, against an internal conical surface or cam on a casing 16 carried by the outer threaded member.

The outer threaded member 14 forms part of the body of the chuck 12 which is fixed to the lower arm 11 of the brace. It may be mounted directly at the end of this arm or connected through the usual releasable ratchet mechanism 17 shown in the drawings. The inner threaded member 13 is a threaded sleeve of small diameter located axially within the outer threaded member 14. The threads connecting the members 13 and 14 are thus of relatively small diameter and operate without excessive friction to transform rotary movement into axial thrust.

An axially movable actuating member 20 is provided for the free inner threaded member 13 of the chuck. The actuating member 20 is a plunger slidable within the threaded sleeve 13 and having a bearing in a split nut 21 screwed into the upper end of the part 14 of the chuck body. Fixed on the upper end of the member 20 is a radial handle 22 which may, if desired, have a length nearly as great as the lower arm 11 of the brace handle. When the actuating member 20 is depressed, the arm 22 lies close to the arm 11 and may be secured to it by a spring clip 23. When the actuating member 20 is in raised position, it is interlocked with the threaded sleeve 13 by engagement between a non-circular head 24 on the plunger 20 and a non-circular recess 25 in the sleeve 13 (see Fig. 3). Depressing the actuating member eliminates this interlock by placing the head 24 in a cylindrical bore in the sleeve 13 as shown in Fig. 4.

In use of the bit brace, the plunger 20 is raised when a tool is inserted in the chuck. This places the handle 22 at a distance from the arm 11 of the brace handle so that they may be gripped with opposite hands to supply a strong torque to the threaded members 13, 14, forcing the gripping jaws 15 into the cone 16 and locking them firmly against the tool. The plunger 20 is then depressed, which releases it from the member 13 so that it can be turned freely and places it close to the arm 11 so that it may be held out of the way over this arm by the spring clip 23 secured to the arm.

What is claimed is:

1. A bit brace comprising a brace handle and a tool chuck having cooperating threaded sleeves for tightening it on a tool, a connection fixing the outer sleeve to the brace handle and leaving the inner sleeve free to turn, a plunger slidably mounted in the inner sleeve, a radial arm fixed on the upper end of the plunger and which lies close to the lower radial arm of the brace handle, in one position of the plunger, and interlocking means on the plunger and sleeve positioned to engage only when the plunger is in another position.

2. A bit brace comprising a brace frame and a tool chuck having cooperating, coaxial, relatively-movable threaded members for tightening the chuck on a tool, a connection fixing the outer member to the brace frame and leaving the inner member free to rotate about the common axis of both members, a plunger mounted for limited axial movement within the inner member, a lever arm fixed on the upper end of the plunger and lying close and parallel to one arm of the brace frame, in one position of the plunger, and cooperating interlocking means on the plunger and on the inner of the two relatively-movable members, positioned to interlock only when the plunger is in another position.

3. A bit brace comprising a brace frame and a tool chuck having cooperating, coaxial, relatively-movable threaded members for tightening the chuck on a tool, a connection fixing the outer member to the brace frame and leaving the inner member free to rotate about the common axis of both members, a plunger mounted for limited axial movement within the inner member, a lever arm fixed on the upper end of the plunger and lying close and parallel to one arm of the brace frame, in one position of the plunger, cooperating interlocking means on the plunger and on the inner of the two relatively-movable members, positioned to interlock only when the plunger is in another position, and a detent between the brace frame and said lever arm for holding said lever arm in fixed position relative to said arm of the brace frame only when said plunger is in its former position.

4. A bit brace comprising a brace handle and a tool chuck having cooperating threaded members for tightening it on a tool, a connection securing the upper end portion of the chuck to the brace handle and leaving one of the threaded members free to turn, means for preventing the free threaded member from projecting from the upper end of the chuck, a movably mounted actuating member for the free threaded member, a radial arm on the upper end of the actuating member and which lies close to the lower radial arm of the brace handle in one position of the actuating member, and interlocking means on the actuating member and on the free member, positioned to engage only when the actuating member is in another position.

ARTHUR M. STONER.
GIRARD S. HAVILAND.

REFERENCES CITED

The following references are of record in the file of this patent:

UNITED STATES PATENTS

| Number | Name | Date |
|---|---|---|
| 331,053 | Griffith | Nov. 24, 1885 |
| 487,123 | Knudsen | Nov. 29, 1892 |
| 1,295,054 | Cooper | Feb. 11, 1919 |
| 1,745,302 | Jones | Jan. 28, 1930 |
| 1,875,737 | Johnson | Sept. 6, 1932 |
| 2,349,162 | Gaskell | May 16, 1944 |